Aug. 22, 1939.   G. R. RICH   2,170,267
ALLOY STEEL
Filed June 17, 1938
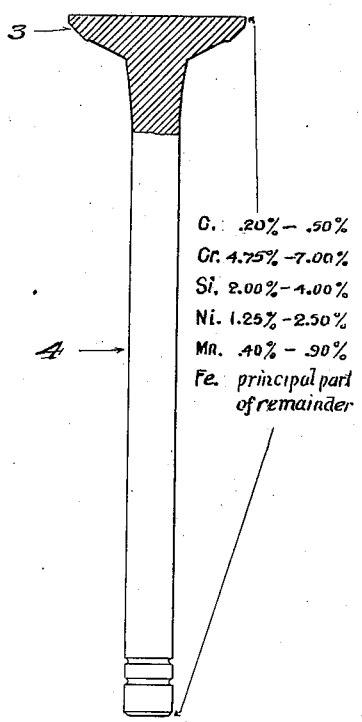
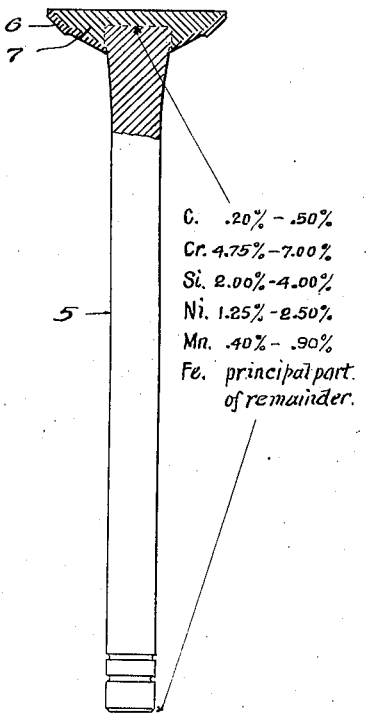
Inventor:
George R. Rich,
by Charles O. Shurocy
his Atty.

Patented Aug. 22, 1939

2,170,267

UNITED STATES PATENT OFFICE 2,170,267

ALLOY STEEL

George R. Rich, Battle Creek, Mich., assignor to Rich Manufacturing Corporation, Battle Creek, Mich., a corporation of Michigan Application June 17, 1938, Serial No. 214,198

1 Claim. (Cl. 75—128)

This invention relates to alloy steel for the manufacture of motor valves and other articles. Its principal object is to provide an alloy steel at a relatively low cost for use in the manufacture of single piece motor valves, and the stems of plural piece motor valves capable of continuous efficient use in high speed motors made in accordance with the present day practice, which valves have greater tensile strength, higher fatigue resistance and are non-scaling, tougher and stiffer than valves heretofore used in high speed motors.

It is a common practice to test motors at the present time at a speed of from 4,600 R. P. M. to above 5,000 R. P. M. and in many cases requiring a spring pressure of up to 140 pounds to seat the valves. The well known "Silchrome" steel valves when elevated to a temperature of 1,400° F. show a maximum tensile strength of only 11,000 pounds which is not sufficient to meet the requirements in the present day high speed motors. They do not have the high fatigue resistance required and are likely to fracture under the severe strain to which they are put in the present day high speed motors.

I have made a great many experiments and tests with alloy steels with the view of providing an alloy steel which, when made into motor valves, will have the required tensile strength and fatigue resistance that are non-scaling, tough and stiff and can be fabricated at a considerably less cost than the "Silchrome" or other high grade alloy steel valves.

I have discovered from my experiments and tests that when chromium, silicon and nickel, together with other alloying elements, are used in a certain definite narrow range of proportions, the above mentioned desirable results are obtained and, furthermore, that no high heat treatment is necessary and is to be avoided in producing the alloy steel valves forming the subject matter of this specification.

With these and other objects and advantages in view, this invention consists in an alloy steel for the manufacture of motor valves and containing chromium, silicon and nickel in the hereinafter defined range of proportions.

The invention, as applied to motor valves, is illustrated in the accompanying drawing, in which:

Fig. 1 is a side elevation partly broken out of a single piece motor valve.

Fig. 2 is a similar view of a multiple piece motor valve.

My new alloy steel is intended for use only in the manufacture of motor valves and their stems and consists of carbon, chromium, silicon, nickel and manganese in certain proportions, the principal part of the remainer being iron. From my experiments I have discovered that the novel results above set forth can only be obtained with the use of the following materials in the proportions specified:

| | Per cent |
|---|---|
| Carbon | .20 to .35 |
| Chromium | 4.75 to 7.00 |
| Silicon | 3.00 to 4.00 |
| Nickel | 1.25 to 2.50 |
| Manganese | .40 to .90 |
| Sulphur | Under .03 |
| Phosphorus | Under .03 |
| Iron | Remainder |

The lower range is intended for valves and valve stems of a lower grade, whereas the higher range is intended for the higher grades of valves and valve stems.

The following proportions are now being used to great advantage in the manufacture of single piece valves and valve stems for use in present day high speed motors:

| | Per cent |
|---|---|
| Carbon | .32 |
| Chromium | 5.50 |
| Silicon | 3.25 |
| Nickel | 2.42 |
| Manganese | .80 |
| Sulphur | .025 |
| Phosphorus | .025 |
| Iron | Remainder |

In the drawing a single piece valve composed of the combination of materials above set forth in the proportions specified is illustrated in Fig. 1, and comprises a disc-like head 3 and a valve stem 4 forged from a length of rod composed of the alloy steel which forms the subject matter of this specification.

In Fig. 2 is illustrated a three piece motor valve, of which the valve stem 5 alone is composed of the alloy steel forming the subject matter of this specification. The head is composed of a cup-like member 6 composed of any desired or required alloy steel placed upon one end of the stem and a cast metal body 7, cast upon the cup-like member and around the end of the valve stem. The stem, cup-like washer and cast metal body are welded together during the fabrication of the valve.

A complete description of the construction of the three piece motor valve illustrated in Fig. 2 will be found in my prior Patent No. 2,037,340 dated April 14, 1936, for improvements in Composite metal article of manufacture. Motor valves requiring a higher grade of material for the exterior of the head than is required for the stem may be constructed in accordance with the valve illustrated in Fig. 2, in which case the stems are cut into lengths from rods composed of the alloy steel forming the subject matter of this specification.

No high heat treatment is required in the production of the present alloy steel one or two piece valves, in fact heat treatment for them up to 1,850° or 1,900° F. is to be avoided. The present alloy steel lends itself admirably to the usual forging practice in the manufacture of valves without scaling and is readily machined to accurate size.

Tests made with motor valves fabricated from my new alloy steel show that they have a tensile strength of 18,000 to 20,000 pounds at 1,400° F. as against 11,000 pounds in valves made of Silchrome or other high grade alloy steel and, further, that the non-scaling property is as high as that of Silchrome when heated to 1,400° F. The result is that when the present motor valves are used in the present day high speed motors having a speed of from 4,600 R. P. M. to 5,000 R. P. M. and used in conjunction with powerful springs to seat them, they stand up in practice, are long lived, have high fatigue resistance, do not require frequent regrinding, seat perfectly and do not warp or wear rapidly. The endurance of the valves when subjected to the violent pounding of the valves on their seats, even when subjected to the high temperatures developed in motors, is unlimited. The fatigue resistance is far above that of any of the higher priced alloy steel valves when used in present day high speed motors.

I find that this is due to the critical proportions of the materials which are used in the manufacture of the alloy steel from which the valves are made.

I claim as new and desire to secure by Letters Patent:

An alloy steel of high tensile strength for the manufacture of motor valve parts and composed of the following ingredients in and about the following proportions, carbon .32%, chromium, 5.50%, silicon 3.25%, nickel 2.42%, manganese .80%, sulphur .025%, phosphorus .025% and the remainder being iron.

GEORGE R. RICH.